United States Patent [19]

Botzler

[11] 4,394,999
[45] Jul. 26, 1983

[54] REDUNDANT OR EMERGENCY STEERING MECHANISM ESPECIALLY FOR AN AIRCRAFT

[75] Inventor: Ludwig Botzler, Neubiberg, Fed. Rep. of Germany

[73] Assignee: Messerschmitt-Boelkow-Blohm Gesellschaft mit beschraenkter Haftung, Munich, Fed. Rep. of Germany

[21] Appl. No.: 179,102

[22] Filed: Aug. 18, 1980

[30] Foreign Application Priority Data

Aug. 21, 1979 [DE] Fed. Rep. of Germany ....... 2933780

[51] Int. Cl.³ .................... B64C 13/16; B64C 13/40
[52] U.S. Cl. ....................................... 244/78; 244/226
[58] Field of Search ............... 244/76 R, 78, 79, 221, 244/226, 227, 228, 196, 197; 91/415, 424, 367, 453, 363 A

[56] References Cited

U.S. PATENT DOCUMENTS

| | | | |
|---|---|---|---|
| 2,705,940 | 4/1955 | Edwards | 244/78 |
| 2,877,968 | 3/1959 | Granan et al. | 244/78 |
| 2,952,244 | 9/1960 | Krauss et al. | 244/227 |
| 3,043,541 | 7/1962 | Hutchinson | 244/78 |
| 3,527,143 | 9/1970 | Hayter | 244/78 |
| 3,580,139 | 5/1971 | Rasmussen | 244/78 |

FOREIGN PATENT DOCUMENTS 1800866 6/1970 Fed. Rep. of Germany .

*Primary Examiner*—Galen L. Barefoot
*Attorney, Agent, or Firm*—W. G. Fasse; D. H. Kane, Jr.

[57] ABSTRACT

A redundant steering mechanism for a craft, especially an aircraft, comprises redundant control components which become effective when the normal steering components become disabled as a result of an electrical power supply failure. The redundant control components do not affect the normal control system but are effective even if the electrical power supply of the craft should fail. The redundant control components are operated by a hydraulic or pneumatic medium acting as a signal carrier. The control signal is a multicomponent signal, one component of which is derived from the pilot's control stick and other signal components are derived from such factors as the speed, the angle of attack and so forth. These signal components are superimposed to form the mechanical emergency control signal for operating a hydraulic or pneumatic steering element.

7 Claims, 1 Drawing Figure

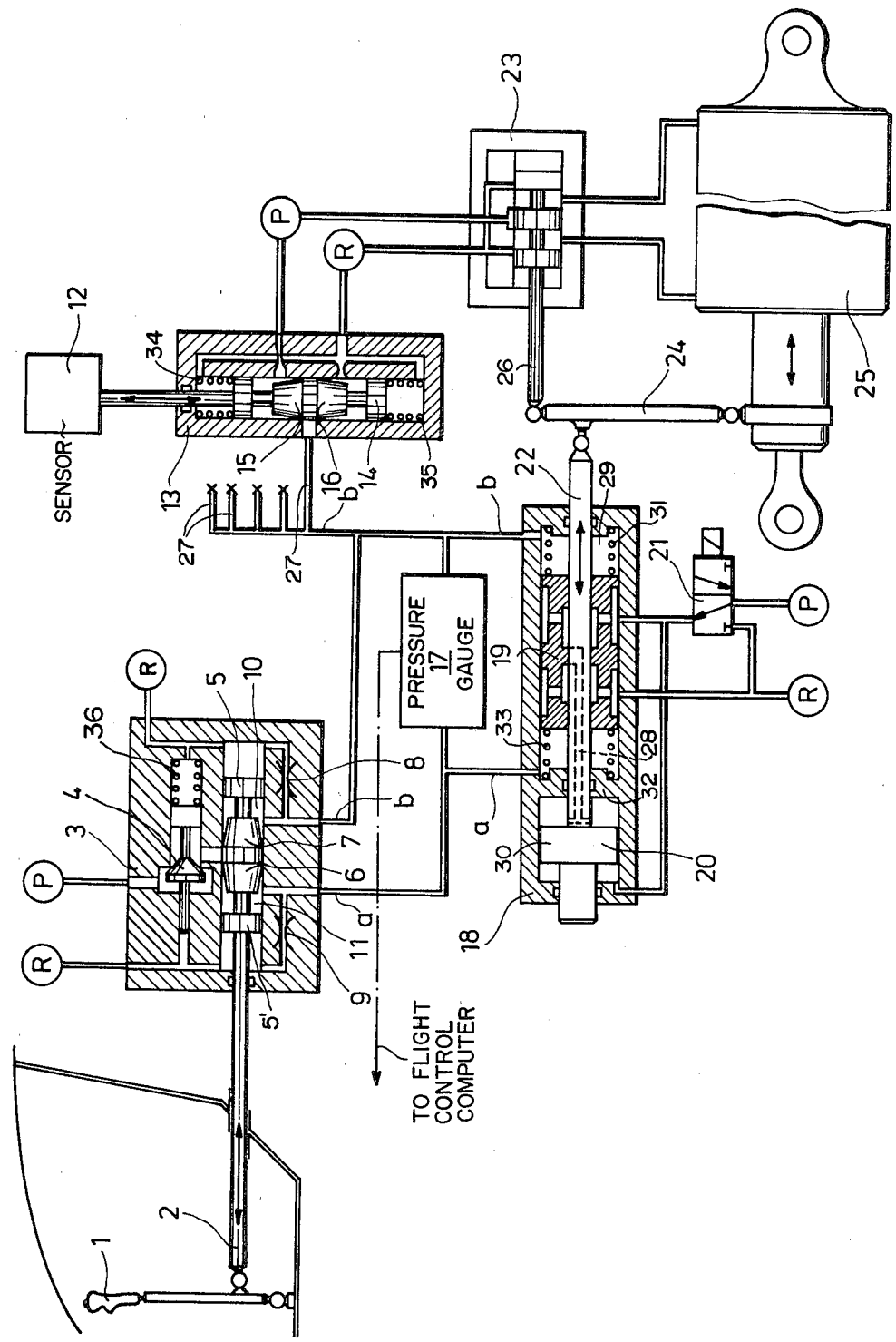

REDUNDANT OR EMERGENCY STEERING MECHANISM ESPECIALLY FOR AN AIRCRAFT

BACKGROUND OF THE INVENTION

The invention relates to a redundant or emergency steering mechanism for a craft, especially an aircraft to secure the functions of a steering system when an aircraft becomes unstable during a disturbed operation such as an emergency, in which a pressure medium, such as a hydraulic medium, is utilized as the signal carrier.

A hydraulic adjustment drive with an electric-hydraulic, open loop control utilizing a hydraulic piston as well as a mechanical control connected in parallel is disclosed in German Patent Publication No. DE-OS 1,800,866. This mechanical control is automatically engaged or becomes effective upon failure of the electric-hydraulic control. This arrangement is supposed to allow a smooth transition to the mechanical control and/or steering in all control positions or under all control conditions in case of failure of the electrical control. To accomplish this purpose, the control rod of the mechanical control system providing the control output signal is divided into two control rods interconnected by means of a lever linkage. The first rod acts as an actuator of a control slide valve for an adjustment piston and the second rod carries a trimming piston which is freely movable during normal operation. Both rods are coordinated by means of a locking or arresting coupling which alternately blocks one or the other control rod.

A purely manual "Back-up Steering Mechanism", as such redundant steering mechanisms are referred to in the art, which is supposed to secure the functions of an unstable aircraft during an emergency or disturbed operation has been found to be insufficient. An unstable aircraft may also be referred to as a "critical" automatic control system. For example, an unstable aircraft without additional stabilizing mechanisms cannot be controlled and/or steered manually.

It has also been suggested in the prior art to make the control paths redundant. However, this solution has proved to be useless, for example, upon failure of the electronic circuit means or upon failure of the electric power supply.

OBJECTS OF THE INVENTION

In view of the above it is the aim of the invention to achieve the following objects singly or in combination:

to produce a redundant or emergency control device for an unstable aircraft which can totally independently take charge of controlling the aircraft upon failure of the normal flight control system;

to make sure that upon the occurrence of a failure the control element which did fail is being switched off, the failure is indicated and that the further safe operation is assured by the redundant control device; and to provide an emergency, "back-up" device or control system which will be effective even if the electrical power supply has failed as long as a source of pressure remains available.

SUMMARY OF THE INVENTION

The invention provides a redundant or emergency control system to assure the functions of the normal control system of an "unstable" craft, such as an aircraft, whereby a pressure signal or signals are used for the emergency back-up operation. The pressure source may be hydraulic or pneumatic. A first, mechanical pressure transducer (3) is responsive to a pilot initiated control stick movement to provide a first pressure signal component. A second pressure transducer (13) is responsive to operating condition sensors to provide a second pressure signal component. The two signal components are superimposed one on the other to produce a pressure representing control signal which is supplied to a control actuator (18) to convert the pressure into a mechanical control signal or rather action. The operating condition sensors may, for example sense the speed, the angle of attack the acceleration of rotation and so forth.

For an unstable aircraft, which may be referred to as a "critical" control system, a redundant control device must assure the functions of the control system in an emergency. However, the redundant system may not influence under any circumstances, the normal control system during normal operation. Under normal operation the control system must be run only by those control elements termed as "active" among all of the diverse control elements. The choice of the source of energy for the redundant control device should be made such that it is that source of energy which is absolutely necessary for the operation of the equipment.

The mentioned use of a hydraulic or pneumatic medium is well suited for this purpose, because both mediums are independent of the electrical power supply source and consequently are also independent of the electrically operated control system. The guide or control signal is derived from the pilot operated control stick and is therefore a mechanical signal in nature. This mechanical signal is transformed into a pressure signal, e.g., a hydraulic signal component outside of the pilot's cockpit. The signals necessary for the stabilization of the aircraft, for example, the angle of incidence, velocity, altitude, etc., are measured by said operating condition sensor and are transformed into respective pressure signals e.g., hydraulic signal components. All these signal components including the guide signal from the control stick are supplied to a pressure actuator such as a hydraulic control actuator which transforms said hydraulic signals back into mechanical signals.

BRIEF FIGURE DESCRIPTION

In order that the invention may be clearly understood it will now be described, by way of example, with reference to the single FIGURE of the drawing showing a hydraulic circuit diagram of a redundant steering mechanism according to the invention.

DETAILED DESCRIPTION OF PREFERRED EXAMPLE EMBODIMENTS AND OF THE BEST MODE OF THE INVENTION

An input signal from the pilot's control stick 1 is mechanically transmitted to the control signal transmitter or first pressure transducer 3 by means of a control rod 2. This control signal transmitter or transducer 3 is a hydraulic-mechanical device which is supplied with a pressure medium by a hydraulic pump "P" through suitable hydraulic conduits including return conduits "R." A valve 21 connects the pump "P" to the respective conduits when there is an electrical power failure as shown. When the electrical power is present under normal operating conditions, the valve 21 is energized and disconnects the pump "P" thereby disabling the valve 18. The servo-piston cylinder 25 is connected to the same hydraulic system P, R. A conventional built-in pressure control valve 4 in the transducer 3 supplies a sliding throttle means having two spaced pistons 5 and 5' with constant pressure which is independent of any pressure fluctuations in the system P, R. Hence, the valve 4 acts as a conventional pressure stabilizer. The sliding throttle means 6, 7 comprises two variable or rather varying throttle members 6, 7 between the pistons 5, 5' and is displaced from its shown middle position corresponding to the position of the control stick 1 relative to the control stick's neutral position, thereby simultaneously varying the throttle cross-section at 6 or 7 when the control stick 1 is moved. A fixed throttle passage 8, 9 is connected in series with each variable throttle 6 and 7 and in parallel, as a bypass, to the respective piston 5, 5' so that a control pressure representing a signal component proportional to the control stick displacement is established in the control chambers 10, 11. This embodiment ensures that the pressure in both control chambers 10, 11 is equal when the control stick is in its neutral position thereby stabilizing the pressure in the entire system. Furthermore, the gradient of the pressure rise relative to the control stick displacement is set or fixed by the construction of the variable throttles 6, 7. A relationship between the control stick position and the control pressure is thereby achieved with sufficient accuracy as is conventional. The pressure control valve 4 is biased by a spring 36.

To stabilize the controlled system of the unstable aircraft it is necessary that further stabilizing signal components are superimposed on the pilot guide or control signal. This occurs in that the various operating condition sensors in the form of flight data sensors 12 actuate a hydraulic sliding throttle 14 in the pressure transducer 13. The control line "b" is connected through conduit 27 and through the movable throttle pair 15, 16 to system pressure "P" or to the return flow "R" corresponding to the position of the flight data sensors 12 or rather the sliding throttles 15, 16 representing the position of the flight data sensor 12. Further conduits 27 are connected to respective pressure transducers such as shown at 13 to provide respective pressure signal components. Thus the control pressure existing in the control line "b" is altered proportionally to the flight data sensor signals from the sensors 12. Biasing springs 34, 35 center the slide member 14 in the pressure transducer 13 under normal operating conditions.

In view of the foregoing, the differential pressure between the control lines "a" and "b" as applied to the piston 19, is proportional to the position of the control stick and to the additional sensor signals from the pressure transducer 13. Such heterodyned pressure is measured by a pressure gage 17 and this information is transmitted to the so-called "Flight Control Computer" for the purpose of status monitoring. Furthermore, the heterodyned pressure displaces a control piston 19 which is normally centered by springs 31 and 33 in the chamber 29 of the hydraulic control actuator 18. This spring centered control piston 19 is held in a middle position during equalized or compensated pressure conditions by means of said prebiased mechanical springs 31 and 33.

The control piston 19 is set into motion by rising heterodyned pressure between the control lines "a" and "b," whereby this displacement is proportional to the control signal representing the heterodyned pressures.

So long as the hydraulic system pressure is available the control piston 19 remains actuatable. Since this hydraulic system pressure is normally too weak, a hydraulic power amplifier including a piston 20 is connected in series to the control piston 19 by an extended piston rod 22 for operation of the system in the so-called "Back-Up-Mode." The piston 20 is located in a chamber 30 separated from the chamber 29 by a wall 32. This power amplifier piston 20 is acted upon by the hydraulic pressure from the pump "P" through the switching valve 21, and by the control piston 19 in such a way that the position of the power amplifier piston 20 corresponds at all times to that of the piston 19, whereby the position of the power amplifier 20 or the hydraulic actuator output at the piston rod 22 in the "Back-Up-Mode" is identical to the position of the piston 19 actuated by the control signal which comprises the pilot and the sensor signal components. The power amplifier 20 is strong enough to actuate the primary control slide valve 23 through a rod 26 and the electric-hydraulic steering or power actuator 25 through the control rod 24. Incidentally, the flow of pressure fluid to the right-hand side of the chamber 30 is through the conduit 28 in the piston rod 22.

In the so-called "Fly-By-Wire Control Mode" the reversing or switching valve 21 is actuated electrically, thereby switching the power amplifier 20 from the hydraulic energy supply "P" to the return flow "R" in which state the power amplifier 20 has no effect upon the control of the hydraulic cylinder 25 and hence the emergency system is switched off or ineffective when the electrical power is available. The controlling or steering of the power actuator 25 is accomplished in this case, that is, under normal operating conditions through the valve 23, or by an active electric-hydraulic control means not shown.

According to the measures described above, the invention assures that when a defect occurs in the course of operation, the defective control element is switched off, the defect is indicated and the further operation is made safe or secure by means of the described redundant control elements. If further defects occur, or if the electrical energy supply fails, the unstable aircraft would be lost without the "Back-Up-System" described above. Therefore, the present redundant steering or control mechanism may also be referred to as an emergency control system.

Although the invention has been described with reference to specific example embodiment, it will be understood that it is intended to cover all modifications and equivalents within the scope of the appended claims.

What is claimed is:

1. A redundant emergency control mechanism for steering an aircraft, comprising pilot controlled mechanical steering means (1, 2), first pressure transducer means (3) operatively connected to said pilot controlled mechanical steering means (3) for converting a movement of said mechanical steering means into a first hydraulic steering control signal component representing a pilot control action, operating condition sensor means (12) which are independent of an electrical power supply for sensing instantaneous flight operating conditions, second pressure transducer means (13) operatively connected to said operating condition sensor means (12) for converting flight operating condition representing signals into flight operating condition representing second hydraulic steering control signal components, pressure operated control actuator means (18) including a source of pressure (P) and conduit means operatively connecting said control actuator means (18) to said first and second pressure transducer means for receiving said first and second hydraulic steering control signal components in a superimposed manner in said control actuator means (18) for converting the resulting combined signal into a mechanical steering control action when an electrical power supply failure occurs in the aircraft, said mechanism further comprising pressure operated power actuator means (25), valve means (23) operatively connecting said second pressure transducer means (13) to said pressure operated power actuator means (25), and mechanical linkage means (22, 24, 26) operatively interconnecting the output (22) of said pressure operated control actuator means (18) to the respective outputs (26, 24) of said valve means (23) and of said pressure operated power actuator means (25), whereby an operation of said control actuator means (18) overrides the normal automatic operation of said power actuator means (25).

2. The mechanism of claim 1, wherein said second pressure transducer means (13) comprise throttling valve means (14), whereby said second pressure signal component from said sensor means operate said throttling valve means for a stabilizing action.

3. The mechanism of claim 1, wherein said pressure operated control actuator means (18) comprise housing means, separator wall means (32) in said housing means forming two chambers (29, 30) in said housing means, piston means (20) operatively located in one of said chambers, control slide valve means (19) operatively located in the other of said chambers, spring means (31, 33) for biasing said control slide valve means in said other chamber, piston rod means (22) operatively connected to said piston means (20) and extending through said control slide valve means, and fluid conduit means (28) operatively extending through said piston rod means for actuating said piston means (20) by said resulting combined signal which is proportional to a displacement of said mechanical steering means and proportional to said instantaneous operating conditions.

4. The mechanism of claim 3, further comprising fluid conduit means operatively interconnecting said first and second pressure transducer means and said control actuator means to produce a differential pressure for operating said control actuator means.

5. The mechanism of claim 3, wherein said slide valve means (19) is connected in series between said first and second pressure transducer means on the one hand and said piston means (20) in said other chamber whereby said piston means operates as a power amplifier.

6. The mechanism of claim 1, wherein said first pressure transducer means (3) comprises housing means, flow passage means in said housing means, pressure supply inlet means, pressure return outlet means and pressure medium flow control means in said housing means, slide valve means (5, 5') in said housing means, means (2) operatively connecting said slide valve means (5, 5') to said steering means (1), said slide valve means (5, 5') being operatively arranged in said housing means, and comprising two spaced piston means and variable flow throttling means (6, 7) operatively arranged between said spaced piston means, said pressure transducer means further comprising fixed flow throttling means operatively arranged to bypass the respective slide valve piston means for making said first pressure signal component proportional to a displacement of said mechanical steering means.

7. A method for a redundant controlling or steering an aircraft when a failure of the electric power supply of the aircraft occurs, comprising the following steps: operatively connecting, in response to said electric power supply failure a pressure supply source to a hydraulic pressure operated control actuator means (18), producing a first hydraulic pressure signal component representing a pilot steering action (1, 2, 3), producing independently of any electrical power supply a second hydraulic pressure signal component representing a sensed instantaneous flight operating condition (12, 13, 14), superimposing said first and second hydraulic pressure signal components in said control actuator means to produce a combined hydraulic steering control signal and using the combined hydraulic steering control signal for activating said hydraulic pressure operated control actuator means (18) to produce a steering action without the use of any electrical power.

* * * * *